Oct. 17, 1967  R. HETMANN  3,347,347
SYNCHRONIZED CLUTCH WITH MULTIPLE FRICTION MEMBERS
Filed Feb. 14, 1966  5 Sheets-Sheet 1

INVENTOR
Richard HETMANN
BY Dicke & Craig
ATTORNEYS

Oct. 17, 1967 R. HETMANN 3,347,347
SYNCHRONIZED CLUTCH WITH MULTIPLE FRICTION MEMBERS
Filed Feb. 14, 1966 5 Sheets-Sheet 2

INVENTOR
Richard HETMANN
BY Dicke & Craig
ATTORNEYS

Oct. 17, 1967  R. HETMANN  3,347,347
SYNCHRONIZED CLUTCH WITH MULTIPLE FRICTION MEMBERS
Filed Feb. 14, 1966  5 Sheets-Sheet 3

INVENTOR
Richard HETMANN
BY Dicke + Craig
ATTORNEYS

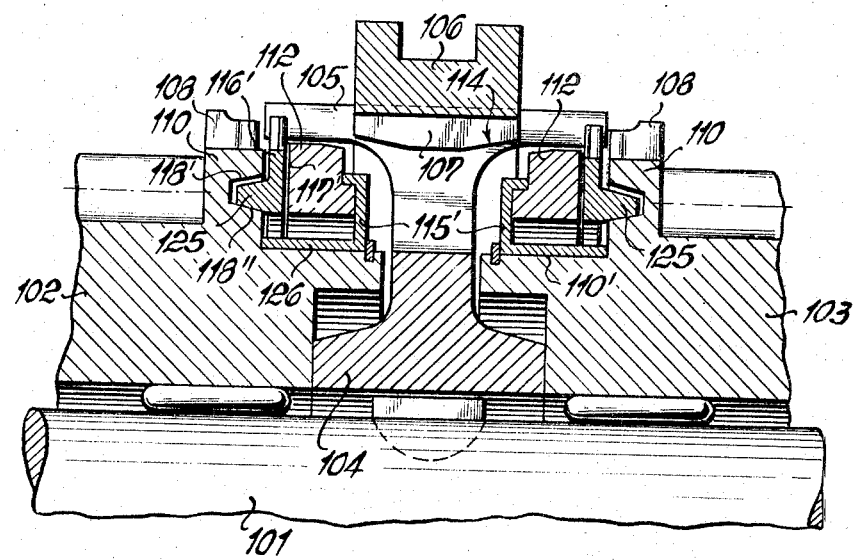
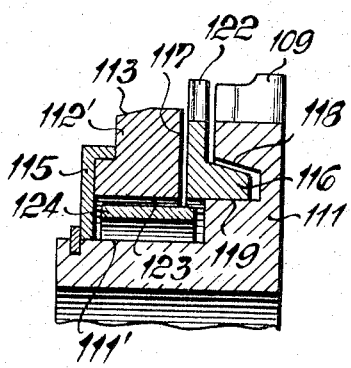
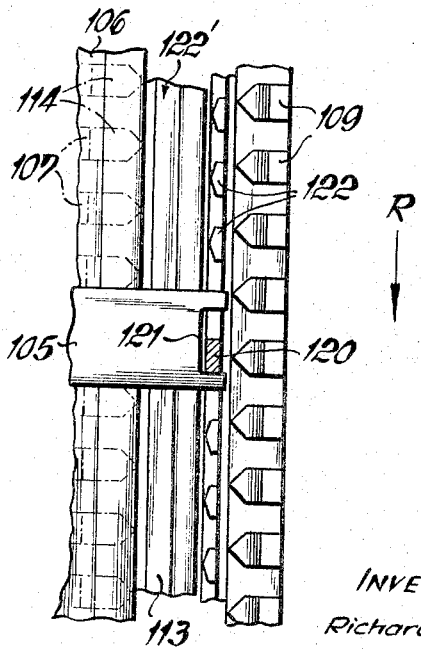

United States Patent Office

3,347,347
Patented Oct. 17, 1967

---

3,347,347
SYNCHRONIZED CLUTCH WITH MULTIPLE
FRICTION MEMBERS
Richard Hetmann, Tamm, Germany, assignor to Firma
Dr. Ing. h.c.F. Porsche K.G., Stuttgart-Zuffenhausen,
Germany
Filed Feb. 14, 1966, Ser. No. 527,002
36 Claims. (Cl. 192—53)

The present invention relates to a synchronizing installation for change-speed transmissions, especially for motor vehicles, which includes a slotted and springy synchronizing ring that effects synchronism when brought into frictional engagement with the shifting teeth of a shifting sleeve, and in which the shifting sleeve adapted to be connected with coupling or clutching bodies of the gear to be engaged is axially displaceably supported on guide webs of a carrier which is in engagement with the transmission shaft carrying the gears for rotation in unison therewith.

With synchronizing installations of this type there is available for the synchronizing work the residual stress or inherent tension of the synchronizing ring, the servo effect thereof, as well as additionally the abutment force of means increasing the servo effect such as support rings, clamping bands or the like. These means cooperate with the internal surface of the synchronizing ring. However, the maximum permissive abutment force of the support rings or the like at the synchronizing ring is limited in consideration of the length of life thereof and thus cannot be increased at will. In order to bring large masses rapidly into synchronism notwithstanding these limitations, it has already been proposed heretofore to provide adjacent the synchronizing ring a second friction member which, actuated by the first friction member, comes into engagement with the friction surfaces at the sleeve carrier in dependence on the force exerted at the shifting sleeve. A considerable acceleration of the synchronizing work is achieved thereby while maintaining the usual structural length of the synchronizing installation. However, it has been discovered that the friction member constructed as clamping band produces, under certain circumstances, an undesirably large blocking effect so that special measures are required such as, for example, the selection of differentiated support angles in order to avoid a self-locking in the synchronizing installation.

Furthermore, with synchronizing installations of this type, it is known for purposes of synchronizing large masses to assist the work of the slotted synchronizing ring by further friction members. Clamping bands serve in particular as additional friction members which cooperate with the hub of the claw carrier or with the carrier of the shifting sleeve. The blocking effect of such friction bands is, however, difficult to control, whence a particularly careful matching of the parts participating in the synchronizing work is necessary. In order to increase the synchronizing capacity, it is further known to utilize the interior surface of the synchronizing ring as friction surface for several circular, segmentally shaped friction cheeks distributed over the circumference. However, a multi-partite construction has to be accepted in connection therewith. Additionally, it is not possible with such prior art constructions to provide means for increasing the servo effect of the synchronizing rings.

The aim and purpose of the present invention essentially consists in enabling, with synchronizing installations of the aforementioned type, the arrangement of one or, in case of need, several additional friction members adjacent the synchronizing ring which do not increase the constructional dimensions and cause no self-locking in the synchronization installation.

Additionally, the aim of the present invention, in contradistinction to the prior art proposals, essentially consists in increasing the synchronizing capacity of the installation without undesirably large blocking effects while maintaining a construction which is as simple as possible, whereby in case of need, additional means for the increase of the servo effect of the synchronizing installation may be provided. Simultaneously therewith, the present invention is to assure that with a small axial force a large normal force is obtained determining the synchronizing work.

According to the present invention, the underlying problems are sloved by a friction member preferably arranged in the plane between the synchronizing ring and the coupling body of the gear to be engaged which friction member is provided with friction surfaces arranged essentially perpendicularly to the shifting direction of the shifting sleeve and is supported in the circumferential direction at the carrier of the shifting sleeve. The synchronization capacity is thereby considerably increased by means of simple parts easily controllable in their design whereby the danger of the self-locking action is excluded. For less highly loaded synchronization operations, i.e., subjected to smaller loads, the installation of means increasing the servo effect of the synchronizing rings can thereby be dispensed with completely which results in a considerably decrease in costs. Simultaneously therewith, a considerable reduction of the shifting force to be applied is clearly noticeable.

The arrangement is thereby advantageously so chosen that the friction member is constituted by a disk which is arranged axially displaceable between one of the end surfaces of the synchronizing ring and the adjacent end surface of the coupling body and is arranged rotatable relative to the surfaces and which is in engagement with the guide webs of the shifting sleeve carrier. The additional expenditures and structural modifications which are necessitated in addition to the synchronizing ring, are thus kept small and essentially consist of turned parts or stampings of simple configuration and shape. If the friction disk is form-lockingly connected with the guide webs of the shifting sleeve carrier by means of extensions distributed over the circumferences and comes into frictional contact directly with the end surfaces of the synchronizing ring and of the coupling body, then parts already present in the synchronizing installation may be utilized for the increased frictional work so that one is able to get along with a single additional structural part. In lieu of the extensions, the friction disk may also be provided with external teeth cooperating with the teeth of the shifting sleeve, which external teeth are provided with gaps for the engagement of the guide webs that are so dimensioned that they permit a limited play in the rotational direction of the friction disk with respect to the sleeve carrier. There is achieved thereby a simple blocking means against shifting through of the shifting sleeve prior to achieving synchronism. At the same time, the tooth engagement between the shifting sleeve and the coupling body is facilitated thereby. In order to avoid an undesired friction work between the friction disk and the parts adjacent the same in the neutral position of the shifting sleeve, the friction disk is retained between the synchronizing ring and the coupling body by means adapted to be overcome by pressure and having a limited axial venting play which act on the synchronizing ring opposite to the shifting direction of the shifting sleeve. Advantageously, these means adapted to be overcome by pressure are constituted by a wedging surface between the synchronizing ring and the coupling body which surface is inclined opposite to the shifting direction of the shifting sleeve. However, the means adapted to be overcome by pressure may also consist of a cup spring which is arranged on the hub of the coupling body and is supported on the synchronizing ring.

In synchronizing installations, in which the synchronizing ring is under the influence of means increasing the servo effect thereof, the friction disk comes into frictional engagement preferably with the end surface adjacent the coupling body and the means increasing the servo effect with the internal surfaces of the synchronizing ring, whereby the servo means are supported in the circumferential direction within the hub of the coupling body and the friction ring at the shifting sleeve carrier. As a result thereof, there is achieved with an above average length of life of the synchronizing installation a particularly efficacious synchronizing work for large masses to be brought into synchronism with a simultaneous spatial favorable arrangement.

In one embodiment, the aims and objects of the present invention are achieved in that a closed friction ring supported in the direction of rotation at the carrier of the shifting sleeve is arranged between the slotted synchronizing ring and the adjacent coupling body which friction ring comes into frictional engagement at the slotted synchronizing ring by means of a friction surface thereof inclined perpendicularly to the shifting direction of the shifting sleeve and comes into frictional engagement with the coupling body by means of at least one conical working surface thereof. A synchronizing installation is achieved thereby in which the synchronizing work is at a predetermined weighted ratio between the slotted synchronizing ring and the closed or endless friction ring, and more particularly by the selection of corresponding angles of inclination of the conical working surfaces of the aforementioned rings. A further increase of the synchronizing work is achieved if the friction ring is provided on the end surface thereof opposite the slotted synchronizing ring with a double cone which cooperates with corresponding counter-surfaces at the coupling body. For purposes of holding and retaining the slotted synchronizing ring with respect to the friction ring, the synchronizing ring is centered in the radial direction on its end surface opposite the friction ring by a retainer or mounting member arranged on the hub of the claw carrier. Relatively short shifting periods can be achieved thereby also with large masses to be brought into synchronism with an insignificantly greater structural expenditure in that the slotted synchronizing ring is provided with a first friction surface coordinated to the teeth of the shifting sleeve and with a second friction surface coordinated to the friction ring as well as with a support surface against which come into abutment the means increasing the servo effect of the synchronizing ring such as curved clamping bands or the like.

Accordingly, it is an object of the present invention to provide a synchronizing installation of the type described above which eliminates, by simple means, the aforementioned drawbacks and shortcomings encountered with the prior art constructions.

Another object of the present invention resides in a synchronizing installation of the aforementioned type which permits an increase in the synchronizing capacity without the danger of the blocking effect caused by the auxiliary means used heretofore to produce such increased capacity.

A further object of the present invention resides in a synchronizing installation for change-speed gears, especially motor vehicles which permits an increase in the synchronizing capacity without sacrificing the normal length of useful life of the installation and without requiring careful matching of all the parts participating in the synchronizing work.

Still a further object of the present invention resides in a synchronizing installation which permits relatively rapid synchronization of larger masses than realizable heretofore without requiring a construction that involves large number of additional parts.

Another object of the present invention resides in a synchronizing installation having a higher synchronizing capacity while at the same time maintaining substantially the same structural length and width as with the prior art installations.

Still another object of the present invention resides in a synchronizing installation of the aforementioned type which is relatively inexpensive notwithstanding the increased synchronizing capacity, is as simple as possible in construction, and produces a relatively large engaging force determining the synchronizing work with a relatively small axial force to be applied to the shifting sleeve.

A further object of the present invention resides in a synchronizing installation of the aforementioned type which not only permits the elimination of auxiliary means increasing the servo effect of the synchronizing ring in case of less highly loaded synchronizing operations, thus entailing a considerable reduction in costs thereof, but additionally permits a considerable reduction in the shifting force to be applied while at the same time allowing relatively short shifting periods even with large masses to be brought into synchronism.

Still another object of the present invention resides in a synchronizing installation which achieves the aforementioned aims and objects principally by the use of elements and parts already present in the synchronizing installation and by maintaining the shape of all parts as simple as possible so as to decrease manufacturing costs.

These and further objects, features and advantages of the present invention will become more obvious from the following description when taken in connection with the accompanying drawing which shows, for purposes of illustration only, several embodiments in accordance with the present invention, and wherein:

FIGURE 5 is a cross-sectional view, on a reduced scale, taken along line V—V of FIGURE 1a;

FIGURE 7 is a center longitudinal cross-sectional view through a portion of a still further modified embodiment of a synchronization installation in accordance with the present invention for a motor vehicle transmission whereby further synchronizing bodies are coordinated in accordance with the present invention to the slotted and springy synchronizing rings.

FIGURE 8 is a partial cross-sectional view of the synchronizing installation of FIGURE 7a, on an enlarged scale; and FIGURE 9 is a partial view, in the unfolded condition, of the synchronizing bodies illustrated in FIGURE 7a.

Figure 1:
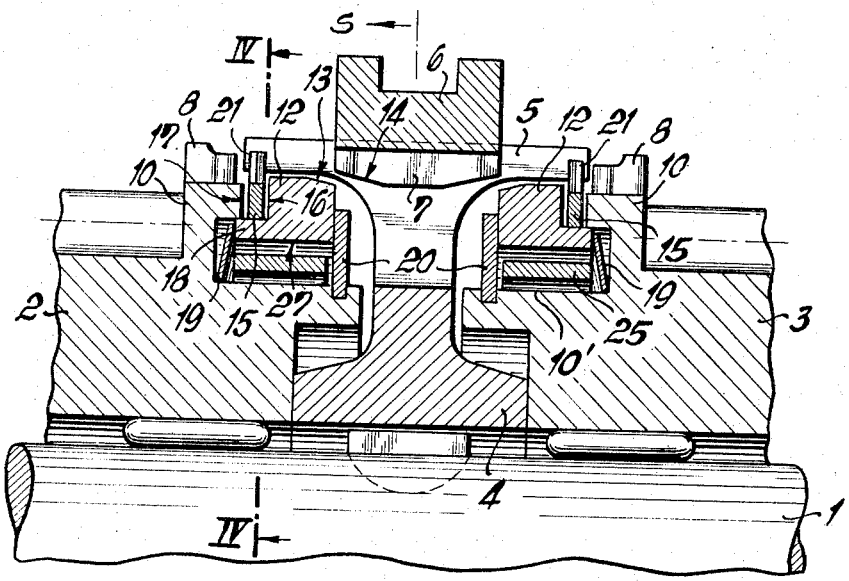
FIGURE 1 is a center longitudinal cross-sectional view through a part of a synchronizing installation for a motor vehicle transmission in which a further synchronizing body is coordinated to each of the slotted and springy synchronization rings in accordance with the present invention.
Figure 2:
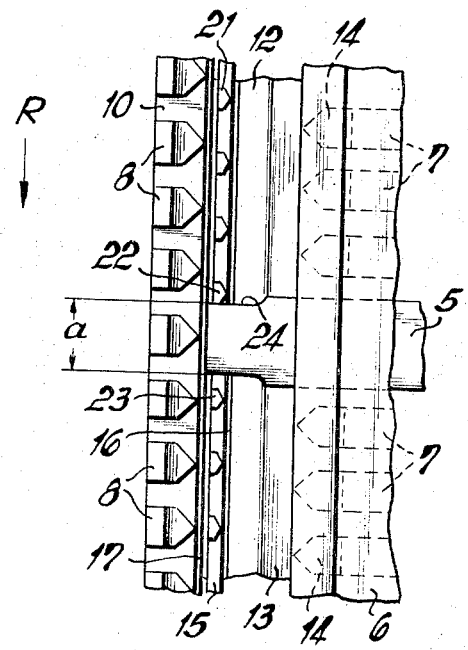
FIGURE 2 is a partial view, in the unfolded condition, of the synchronizing bodies illustrated in FIGURE 1 together with the transmission parts bringing about the synchronism.
Figure 4:
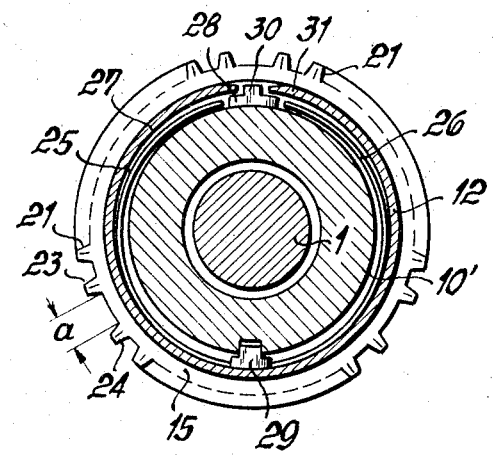
FIGURE 4 is a cross-sectional view, on a reduced scale, through the synchronization installation of FIGURE 1 and taken along line IV—IV of FIGURE 1.

Referring now to the drawing wherein like reference numerals are used throughout the various views to designate like parts, and more particularly to FIGURE 1, showing a portion of a shifting-sleeve-type transmission, gears 2 and 3 are freely rotatably but axially non-displaceably arranged on the transmission shaft 1 of the transmission. The gears 2 and 3 are in constant meshing engagement with gears arranged on a transmission shaft (not shown). A carrier 4 which is mounted on the transmission shaft 1 by a splined connection, is provided with three guide webs 5 (FIG. 5) distributed uniformly over the circumference thereof. A shifting sleeve 6 is axially displaceably supported on the guide webs 5. The shifting sleeve 6 is provided with shifting teeth 7 which come into engagement at one end of a respective shifting operation with the teeth 8 of the coupling bodies 10, which are connected with the gears 2 and 3 or are formed integrally therewith. A slotted and springy synchronizing ring 12 is arranged on the hub 10' of the coupling body 10 whose circumferential surfaces generally designated by reference numeral 13 are adapted to come into frictional engagement with the head surfaces 14 of the shifting teeth 7 of the shifting sleeve 6 by displacement of the shifting sleeve 6 in the shifting direction S. A further friction member 15 is arranged in the form of a friction disk within the plane between the synchronizing ring 12 and the coupling body 10. A friction surface 16 (FIG. 2) at the synchronizing ring 12 which is arranged substantially perpendicularly to the shifting direction S of the shifting sleeve 6 and a friction surface 17 at the coupling body 10 which is directed substantially parallelly thereto are coordinated to the friction disk 15. The friction disk 15 is held on a shoulder 18 with axial play between the friction surfaces 16 and 17. A cup spring 19 mounted on the hub 10' serves for purposes of maintaining the play in the neutral position of the coupling body 10; the cut spring 19, prestressed in a direction opposite the shifting direction S, abuts against the shoulder 18 of the synchronizing ring and presses the same toward the locking ring 20. The friction disk 15 is provided along its outer circumference with teeth 21 whose spacing corresponds to the tooth distribution of the shifting sleeve 6. The tooth arrangement 21 is provided with gaps a (FIG. 2) for the engagement of the three guide webs 5 of the shifting sleeve 6. The teeth 22 and 23 of the tooth arrangement 21 adjacent each gap a form, together with the apertures 24 at the guide webs 5, a blocking means against the shifting through of the shifting sleeve 6 before synchronism is achieved. Furthermore, a conventional means for increasing the servo effect of the synchronizing ring 12 is arranged between the synchronizing ring 12 and the hub 10' of the claw carrier 10. These means include two clamping bands 25 and 26 (FIG. 4) which are arranged on the inner surface 27 of the synchronizing ring 12 between abutments 28 and 29. The abutment 28 extends with a nose portion 30 between the slotted ends 31 of the synchronizing ring 12 whereas the abutment 29 is tiltably held in the hub portion 10'.

*Operation*

If the shifting sleeve 6 rotating together with the transmission shaft 1 is displaced from its neutral position (FIG. 1) in the shifting direction S, then at first the head surfaces 14 of the shifting teeth 7 come into frictional engagement with the circumferential surface 13 of the synchronizing ring 12 whereby the synchronizing ring 12 is gradually accelerated with slippage to the rotational speed of the shifting sleeve 6. By applying further shifting pressure to the shifting sleeve 6 while overcoming the force of the cup spring 19, simultaneously the friction surface 16 of the friction ring 12 as well as the friction surface 17 of the coupling body 10 come into frictional engagement with the friction disk 15 upon further displacement of the shifting sleeve 6. The friction disk 15 thereby abuts in the direction of rotation R with the aid of the tooth 22 against the aperture 24 of the guide webs 5 of the shifting sleeve carrier 4.

Figure 6:
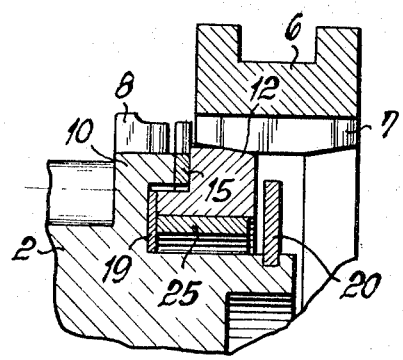
FIGURE 6 is a partial cross-sectional view of the synchronizing installation according to FIGURE 1 in the working position of the synchronizing bodies.

As a result of the now strongly increasing synchronizing work betweeen the synchronizing bodies 7 and 15 rotating at the rotational speed of the transmission shaft 1 and the members to be accelerated or to be braked, i.e., the synchronizing ring 12 and/or the coupling body 10, synchronism is achieved rapidly. Additionally, the synchronizing operation is assisted by the clamping band 25 pressed by way of the abutment 28 of the synchronizing ring 12 against the inner surface 27 thereof. The position of maximum synchronizing work is shown in FIGURE 6. If, in this manner, rotational speed equality is achieved between the parts to be coupled, then the blocking means 22, 24 as well as the clamping band 25 are disengaged, i.e., become ineffectual whereby the shifting teeth 7 can be brought, pressed over the synchronizing ring 12, into engagement with the teeth 8 of the coupling body 10. The synchronizing work is thereby distributed in this embodiment over three surfaces at the synchronizing ring whereby with a short shifting period a large synchronizing moment is achieved whereas simultaneously the shifting force to be applied is kept relatively small. Similarly, an effective unblocking is established at the end of the synchronizing operation.

Figure 1A:
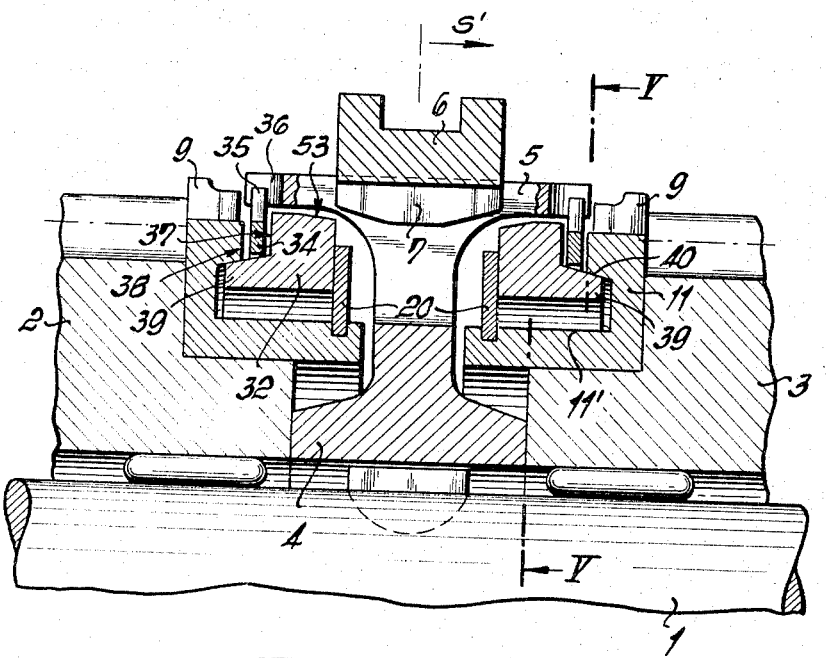
FIGURE 1a is a center longitudinal cross-sectional view, similar to FIGURE 1, through a modified embodiment of a synchronizing installation in accordance with the present invention.
Figure 3:
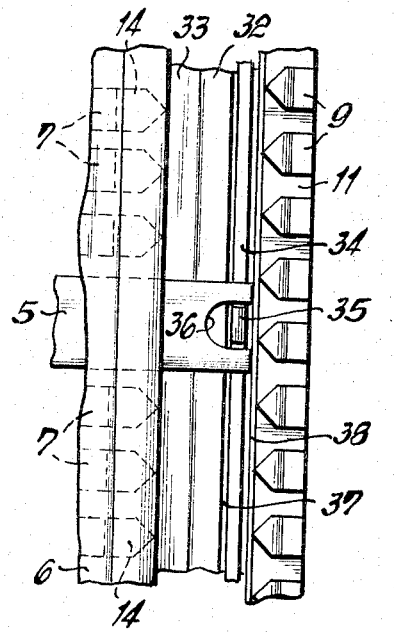
FIGURE 3 is a partial view in the unfolded condition, of the synchronizing bodies illustrated in FIGURE 1a in the neutral position thereof.
Figure 5:
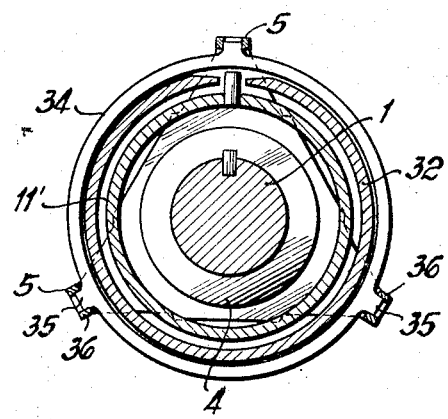

A simplified construction of the present invention is shown in FIGURE 1a taken in conjunction with FIGURES 3 and 5 whereby principally the use of means increasing the servo effect of the synchronizing ring as well as a blocking means blocking the speed engagement are dispensed with. A slotted and springy synchronizing ring 32 is held in the axial direction on the hub 11' of the coupling body 11 between a locking ring 20 and the coupling body 11. The synchronizing ring 32 is also provided with a circumferential surface 33 which comes into frictional engagement with the head surfaces 14 of the shifting teeth 7 of the shifting sleeve 6. Within the plane between the synchronizing ring 32 and the coupling body 11 a friction disk 34 is arranged which is connected by a number of extensions 35, corresponding to the number of the guide webs 5, with the sleeve carrier 4. The extensions 35 are in engagement with a respective aperture 36 in the guide webs 5. The friction disk 34 also cooperates with friction surfaces 37 and 38 arranged substantially perpendicularly to the shifting direction S' of the shifting sleeve 6 at the synchronizing ring 32 and at the coupling body 11, respectively. The friction disk 34 is retained on a shoulder 39 of the synchronizing ring 32 with a limited axial play between the friction surfaces 37 and 38. The play for the friction disk 34 is forcibly brought about by a wedging surface 40 which extends between the shoulder 39 and the coupling body 11 and which is inclined opposite to the shifting direction S'. Upon displacement of the shifting sleeve 6 in the shifting direction S' the friction surfaces 33 and 37 of the friction ring 32 as well as the friction surface 38 at the coupling body 11 come into frictional engagement, as in the previously described embodiment, with the corresponding counter surfaces at the shifting sleeve 6 and at the friction disk 34. With this construction only the synchronizing work of the friction disk 34 is utilized in addition to the synchronizing work of the slotted and springy ring 32.

Figure 7A:
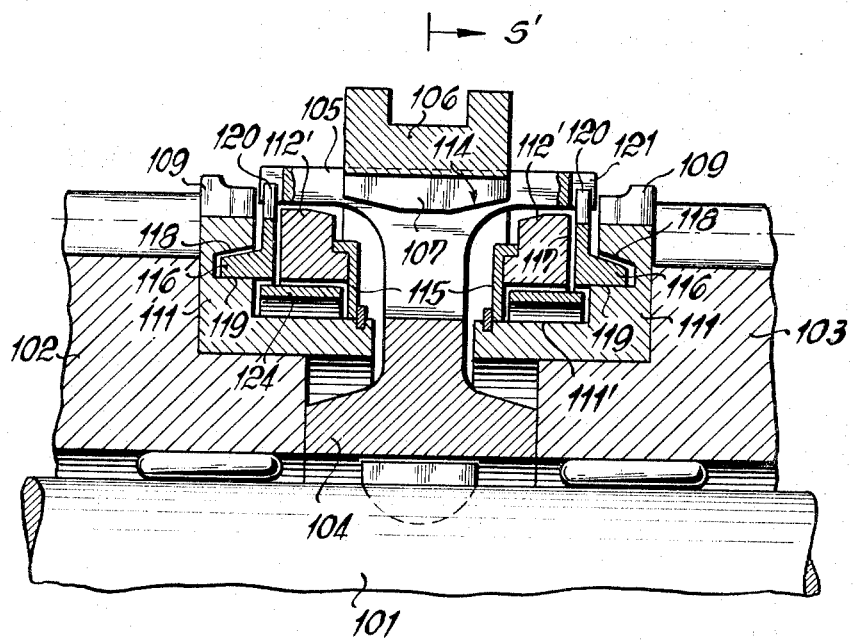
FIGURE 7a is a center longitudinal cross-sectional view through a portion of a synchronizing installation, similar to FIGURE 7, which is provided with modified synchronizing bodies.

In the embodiments illustrated in FIGURES 7 and 7a, in which similar reference numerals of the 100 series are used to designate corresponding parts, the gears 102 and 103 are freely rotatably but longitudinally non-displaceably arranged on the transmission shaft 101. A carrier 104 is splined to the transmission shaft 101; the carrier 104 is provided with three guide webs 105 arranged uniformly distributed over the circumference thereof on which a shifting sleeve 106 is displaceably supported in a known manner. The shifting sleeve 106 is provided with shifting teeth 107 which, at the end of a shifting operation, come into engagement with the teeth 108 and 109 of the coupling bodies 110 and 111 of FIGURES 7 and 7a, respectively, which are connected with the gears 102 and 103 or are formed integrally therewith. A slotted and springy synchronizing ring 112 or 112' is arranged on the hub 110' or 111' of the coupling body 110 or 111. The circumferential surface 113 of the synchronizing ring 112 or 112' comes into frictional engagement with the head surfaces 114 of the shifting teeth 107 by displacement of the shifting sleeve 106 in the shifting direction S or S', respectively. The synchronizing ring 112 is centered in the radial direction by a mounting or retainer element 115 accommodated on the hub 110'. A closed or endless friction ring 116' or 116 is arranged between the synchronizing ring 112 or 112' and the coupling body 110 or 111, respectively, which ring cooperates with a friction surface 117 at the synchronizing ring 112 or 112' inclined perpendicularly to the shifting direction S or S' of the shifting sleeve and with a conical working surface 118' or 118 at the coupling body 110 or 111.

The friction ring 116 of FIG. 7a is retained with axial play on a shoulder 119 of the coupling body 111 and is in engagement in the direction of rotation R (FIG. 9) by way of a number of abutments 120 corresponding to the number of guide webs 105 with the sleeve carrier 104. The abutments 120 are kept in a respective aperture 121 of the guide webs 105 with a circumferential play corresponding to the tooth spacing of the shifting sleeve 106 and of the coupling body 111. The friction ring 116 is provided on both sides of the abutments 120 with teeth 122 whose distribution and spacing also corresponds to that of the shifting sleeve 106 and that of the coupling body 111. The inner surface 123 of the synchronizing ring 112' serves as abutment surface for a conventional blocking member 124. The blocking members 124 serve for increasing the servo effect of the synchronizing ring.

The arrangement and operation of FIGURE 7 is similar to that of FIGURE 7a insofar as its abutments 120, apertures 121 and teeth 122 are concerned; hence a showing similar to FIGURE 9 is dispensed with for FIG. 7.

Operation

During the drive of the transmission shaft 101, the shifting sleeve 106 and the friction ring 116 are taken along by way of the carrier 104 in the direction of rotation R. For purposes of coupling the gear 103 (FIG. 7a) with the shaft 101, the shifting sleeve 106 is displaced from its neutral position in the shifting direction S' whereby at first the head surfaces 114 of the shifting teeth 107 come into frictional engagement with the circumferential surface 113 (FIG. 8) of the synchronizing ring 112' (FIGS. 7a and 8). By further forcing or pressing the shifting sleeve 106 in the initiated shifting direction, the friction ring 116 is pressed against the conical working surface 118 of the coupling body 111. By reason of the fact that the friction ring 116 is held in the direction of rotation R by the abutments 120 in the aperture 121 of the guide webs 105 (FIG. 9), the synchronizing work takes place at the surfaces 113 and 117 of the slotted synchronizing ring and at the working surface 118 of the coupling body 111, respectively. The synchronizing work is aided by the blocking bodies 124 which, as a result of the compression of the slotted synchronizing ring 112', when the shifting sleeve 106 slides over the same, increase the servo effect in that they press against the inner surface 123 of the synchronizing ring 112'. The synchronizing ring 112' is held fast in the direction of rotation during the synchronizing work. If synchronism is now achieved in this manner, then the shifting sleeve 106 can be brought into engagement with the teeth 109 of the coupling body 111 through the toothed arrangement 122 of the friction ring 116. The shifting operation is thereby completed so that the gear 103 rotates with the rotational speed of the shaft 101.

In FIGURE 7, there is illustrated an embodiment in which the friction ring 116' is provided with a double cone 125 and the mounting or retainer element 115' of the synchronizing ring 112 with a hub portion 126. The remaining construction of the synchronizing installation corresponds to that described in connection with FIGURE 7a. By reason of the fact that two working surfaces 118' and 118" are available for the synchronizing work at the coupling body 110 in addition to the vertical friction surface 117' at the synchronizing ring 112, one may in this embodiment dispense with the installation of additional means for increasing the servo effect of the synchronizing ring. In case of extreme loads, however, it is also possible without difficulty to come back to such means if this should prove as necessary.

Whereas the slotted synchronizing rings consist of steel provided with a wear-resistant coating at the friction surfaces thereof, a bronze alloy has proved itself particularly favorable as material for the endless friction rings. However, it is also possible to make the closed or endless friction rings also of steel and to provide the same for purposes of increasing the length of life with a wear-resistant coating, for example, of molybdenum or the like.

While I have shown and described several embodiments in accordance with the present invention, it is understood that the same is not limited thereto but is susceptible of numerous changes and modifications as known to a person skilled in the art. For example, in lieu of a friction disk in the manner of a clutch lamellae, also other friction bodies, for example, on ceramic bases, may be provided between the synchronizing ring and the coupling body coordinated thereto. Furthermore, the guide webs for securing the friction bodies may be constructed as separate inset pieces and may be detachably accommodated at the sleeve carrier.

Thus, it is obvious that the present invention is susceptible of numerous changes and modifications as known to a person skilled in the art, and I therefore do not wish to be limited to the details shown and described herein but intend to cover all such changes and modifications as are encompassed by the scope of the appended claims.

I claim:

1. In a synchronizing installation for change-speed transmissions, especially motor vehicles, which includes a slotted and springy synchronizing ring that effects synchronism when brought into frictional engagement with the shifting teeth of a shifting sleeve and in which the shifting sleeve, adapted to be connected with the coupling bodies of the gear to be engaged, is axially displaceably supported on guide webs of a carrier which is connected for rotation in unison with the transmission shaft carrying the gears, the improvement comprising a friction member arranged in the plane between the slotted synchronizing ring and the coupling body of the gear to be engaged, said friction member coming into frictional engagement with the adjacent friction surfaces provided at the slotted synchronizing ring and at the coupling body and being supported in the circumferential direction at the carrier of the shifting sleeve.

2. The combination according to claim 1, wherein the friction surfaces coordinated to the friction member are disposed essentially perpendicular to the shifting direction of the shifting sleeve.

3. The combination according to claim 2, wherein said friction member is constituted by a disk arranged axially displaceable between one of the end surfaces of the synchronizing ring and the adjacent end surface of the coupling body and rotatable relative to said last-mentioned surfaces, and said friction disk being in operative engagement with the guide webs of the shifting sleeve carrier.

4. The combination according to claim 3, wherein said friction disk is provided with extensions distributed along the circumference thereof, said friction disk being formlockingly connected with the guide webs of the shifting sleeve carrier by means of said extensions, and said friction disk coming into frictional engagement directly with the end surfaces of the synchronizing ring and of the coupling body.

5. The combination according to claim 3, wherein said friction disk is provided with external teeth means cooperating with the teeth of the shifting sleeve, said teeth means being provided with gaps for the engagement of the guide webs, said gaps being so dimensioned that they enable a limited rotational play of the friction disk with respect to the sleeve carrier.

6. The combination according to claim 3, further comprising means for retaining said friction disk between the synchronizing ring and the respective coupling body, said last-mentioned means being adapted to be overcome by pressure and acting on the synchronizing ring in the direction opposite to the shifting direction of the shifting sleeve.

7. The combination according to claim 6, wherein said last-mentioned means are constituted in effect by wedging surface means inclined opposite to the shifting direction of the shifting sleeve between the synchronizing ring and the coupling body.

8. The combination according to claim 6, wherein said last-mentioned means includes cup spring means, said cup spring means being accommodated on a hub portion of the coupling body and being supported at the synchronizing ring.

9. The combination according to claim 1, wherein said friction member is constituted by a disk arranged axially displaceable between one of the end surfaces of the synchronizing ring and the adjacent end surface of the coupling body and rotatable relative to said last-mentioned surfaces, and said friction disk being in operative engagement with the guide webs of the shifting sleeve carrier.

10. The combination according to claim 9, wherein said friction disk is provided with extensions distributed along the circumference thereof, said friction disk being form-lockingly connected with the guide webs of the shifting sleeve carrier by means of said extensions, and said friction disk coming into frictional engagement directly with the end surfaces of the synchronizing ring and of the coupling body.

11. The combination according to claim 9, wherein said friction disk is provided with external teeth means cooperating with the teeth of the shifting sleeve, said teeth means being provided with gaps for the engagement of the guide webs, said gaps being so dimensioned that they enable a limited rotational play of the friction disk with respect to the sleeve carrier.

12. The combination according to claim 9, further comprising means for retaining said friction disk between the synchronizing ring and the respective coupling body, said last-mentioned means being adapted to be overcome by pressure and acting on the synchronizing ring in the direction opposite to the shifting direction of the shifting sleeve.

13. The combination according to claim 12, wherein said last-mentioned means are constituted in effect by wedging surface means inclined opposite to the shifting direction of the shifting sleeve between the synchronizing ring and the coupling body.

14. The combination according to claim 12, wherein said last-mentioned means includes cup spring means, said cup spring means being accommodated on a hub portion of the coupling body and being supported at the synchronizing ring.

15. The combination according to claim 4, further comprising means for retaining said friction disk between the synchronizing ring and the respective coupling body, said last-mentioned means being adapted to be overcome by pressure and acting on the synchronizing ring in the direction opposite to the shifting direction of the shifting sleeve.

16. The combination according to claim 5, further comprising means for retaining said friction disk between the synchronizing ring and the respective coupling body, said last-mentioned means being adapted to be overcome by pressure and acting on the synchronizing ring in the direction opposite to the shifting direction of the shifting sleeve.

17. The combination according to claim 1, further comprising means acting on the synchronizing ring for increasing the servo effect thereof, the friction member coming into frictional engagement with the end surface adjacent the coupling body and said last-mentioned means coming into frictional engagement with the inner surface of the synchronizing ring, said last mentioned means being supported in the hub portion of the respective coupling body and the friction ring being supported in the circumferential direction at the shifting sleeve carrier.

18. The combination according to claim 3, further comprising means acting on the synchronizing ring for increasing the servo effect thereof, the friction member coming into frictional engagement with the end surface adjacent the coupling body and said last-mentioned means coming into frictional engagement with the inner surface of the synchronizing ring, said last-mentioned means being supported in the hub portion of the respective coupling body and the friction ring being supported in the circumferential direction at the shiftnig sleeve carrier.

19. The combination according to claim 1, wherein said friction member is constituted by an endless friction ring supported in the direction of rotation at the carrier of the shifting sleeve, said friction ring coming into frictional engagement with friction surfaces at said synchronizing ring which are inclined substantially perpendicularly to the shifting direction of the shifting sleeve and at least with one conical working surface provided at the respective coupling body.

20. The combination according to claim 19, wherein said friction ring is provided with a double cone on the end surface opposite the synchronizing ring, said double cone cooperating with corresponding counter surfaces at the coupling body.

21. The combination according to claim 20, further comprising centering means mounted on a hub portion of the coupling body for centering in the radial direction the synchronizing ring at the end surface opposite the friction ring.

22. The combination according to claim 19, further comprising centering means mounted on a hub portion of the coupling body for centering in the radial direction the synchronizing ring at the end surface opposite the friction ring.

23. The combination according to claim 19, further comprising means for increasing the servo effect of the synchronizing ring, and wherein said sychronizing ring is provided with a first friction surface coordinated to the teeth of the shifting sleeve, with a second friction surface coordinated to the friction ring, and with a support surface against which abut the means increasing the servo effect of the synchronizing ring.

24. The combination according to claim 20, further comprising means for increasing the servo effect of the synchronizing ring, and wherein said synchronizing ring is provided with a first friction surface coordnated to the teeth of the shfting sleeve, with a second friction surface coordinated to the friction ring, and with a support surface against which abut the means increasing the servo effect of the synchronizing ring.

25. A synchronizing installation for change-speed transmissions having a transmission shaft rotatably carrying the gear means to be engaged, especially for motor vehicles, comprising shifting sleeve means provided with shifting teeth means, coupling body means on the gear means to be engaged, slotted and springy synchronizing ring means operable to effect synchronism when brought into frictional engagement with the shifting teeth means of the shifting sleeve means, carrier means having guide web means and operatively connected for rotation in unison with the transmission shaft, said shifting sleeve means being axially displaceably supported on said guide web means and being adapted to be connected with said coupling body means, and further friction means between the slotted synchronizing ring means and the coupling body means of the gear means to be engaged, said further friction means coming into frictional engagement with adjacent friction surfaces provided at the slotted synchronizing ring means and at the respective coupling body means.

26. The combination according to claim 25, wherein said further friction means is provided with friction surfaces extending substantially perpendicularly to the shifting direction of said shifting sleeve means at least on one end surface thereof.

27. The combination according to claim 25, wherein said further friction means is provided with friction surfaces extending substantially perpendicularly to the shifting direction of the shifting sleeve means at both end surfaces thereof.

28. The combination according to claim 25, wherein said further friction means is provided at least at one end surface thereof with a friction surface of conical shape.

29. The combination according to claim 25, wherein said further friction means is provided at least at one end surface thereof with a friction surface of double conical shape.

30. The combination according to claim 25, wherein said further friction means is operatively connected with said carrier to rotate in unison therewith.

31. The combination according to claim 30, wherein said further friction means is provided with friction surfaces extending substantially perpendicularly to the shifting direction of said shifting sleeve means at least on one end surface thereof.

32. The combination according to claim 30, wherein said further friction means is provided with friction surfaces extending substantially perpendicularly to the shifting direction of the shifting sleeve means at both end surfaces thereof.

33. The combination according to claim 30, wherein said further friction means is provided at least at one end surface thereof with a friction surface of conical shape.

34. The combination according to claim 30, wherein said further friction means is provided at least at one end surface thereof with a friction surface of double conical shape.

35. The combination according to claim 30, further comprising means for providing an axial play between said further friction means and the synchronizing ring means with the shifting sleeve means in the neutral position.

36. The combination according to claim 25, further comprising means for radially centering said synchronizing ring means including annular elements in engagement with the friction ring means on the end surfaces opposite said further friction means.

References Cited
UNITED STATES PATENTS

| | | | |
|---|---|---|---|
| 2,200,851 | 5/1940 | Osborne | 192—53.6 |
| 2,930,462 | 3/1960 | Willis | 192—53.6 |
| 3,224,534 | 12/1965 | Boguslawski et al. | 192—53.3 |
| 3,239,044 | 3/1966 | Boguslawski et al. | 192—53.3 |
| 3,272,291 | 9/1966 | Flinn | 192—53.6 |

BENJAMIN W. WYCHE III, *Primary Examiner.*